April 19, 1960
C. D. CHAMBERLIN
2,932,906
CHILD'S COLORING APPARATUS
Filed Oct. 13, 1955
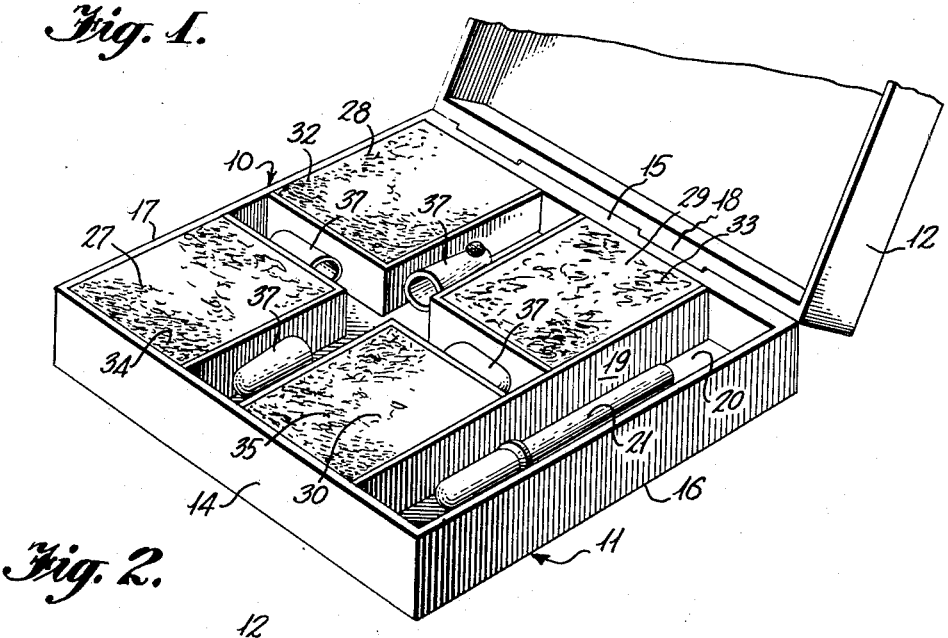
INVENTOR
Catherine D. Chamberlin
BY Mason, Fenwick & Lawrence
ATTORNEYS

United States Patent Office 2,932,906
Patented Apr. 19, 1960

2,932,906

CHILD'S COLORING APPARATUS

Catherine D. Chamberlin, Wyomissing, Pa.

Application October 13, 1955, Serial No. 540,232

2 Claims. (Cl. 35—26)

The present invention relates in general to educational apparatus and more particularly to apparatus adapted especially for use in elementary grade classrooms in connection with art and reading instruction.

In recent years, formal education in reading has been directed primarily toward the development of great reading speed. With the emphasis on reading speed, the old phonetic technique of teaching reading by first teaching the alphabet and associating the individual letters with their sounds, then progressing through the phonics of consonant combinations, single vowel words and syllables to the recognition of multiple syllable words by their component syllables, was discarded as this technique was considered to hinder the achievement of desired reading speeds. Recognizing that the development of desired reading speed required a quicker response to words than could be practically realized by those taught to read phonetically, educational circles shifted to the "whole word method" or sight method of teaching reading, wherein the child is taught from the beginning to recognize words from the appearance of each word as a unitary whole rather than relying upon response to the component parts or syllables of the word.

While a number of children have shown a satisfactory aptitude to this method of learning to read, many children have failed to develop adequate reading skills when taught in this way. It is believed that this technique has been unsuccessful with many children because their basic perception responses are to haptic experiences. Their basic imagery is in geometric figures and patterns rather than words. To develop adequate word imagery in such children, the kinesthetic-tactile approach is required, wherein the child is caused to trace over specimens of words prepared by the instructor while simultaneously repeating the word aloud or variants of this procedure in which the child writes the word on a blank card while repeating the word aloud. This procedure permits a greater over-all sense preception and gives rise to a better understanding of the relationship of words or symbols to the spoken word. This kinesthetic-tactile technique therefore assists in the development of a well-retained word image for successful future recall, especially in the case of children having primarily a geometric or haptic perceptive response.

In the use of this kinesthetic-tactile method, it has been the common practice to have the child trace the words with a pencil. However, a pencil tightly gripped by a child of five to eight years of age causes such fatigue as to reduce the attention span and cause frustration. This procedure therefore dulls the motor response and defeats the desired fixing of the word image.

The present invention also has particular application to art instruction. Art instruction for children in the beginning elementary school grades frequently involves exercizes in finger painting, wherein the children directly apply paint or other coloring media to paper, using their fingers to transfer the paint from the paint container to the paper. The open containers of liquid paint or coloring media which must be made accessible to the children during such exercizes require extraordinary measures to insure effective prevention from soiling clothing or classroom fixtures. Additionally, it is exceedingly difficult to protect the children's clothing from being soiled by the residual paint or coloring media on the fingers during or at the completion of such exercizes.

An object of the present invention, therefore, is the provision of a novel educational aid for classroom use in connection with reading and art instruction.

Another object of the present invention is the provision of novel educational apparatus which will enhance the effectiveness of the kinesthetic-tactile approach to reading instruction.

Another object of the present invention is the provision of a novel kit for classroom use containing coloring and writing media together with applicators therefor whereby effective control may be exercized over the quantity of such media available so as to minimize the danger of soiling clothing and other objects about the classroom.

Other objects, advantages and capabilities of the present invention will become apparent from the following detail description, taken in conjunction with the accompanying drawing showing one preferred embodiment of the invention.

Referring to the drawing:

Figure 1 is a perspective view of educational apparatus embodying the present invention;

Figure 2 is a top plan view of the educational apparatus;

Figure 3 is a section view taken along the line 3—3 of Figure 2; and,

Figure 4 is a longitudinal section view of the finger cot or thimble applicator.

Referring to the drawing, wherein like reference characters designate corresponding parts throughout the several figures, the preferred embodiment of the present invention is constructed in kit form to render the same convenient for use both in the practice of the kinesthetic-tactile method of reading instruction and in connection with finger painting art exercizes, and to this end is housed in a suitable box 10, preferably molded from plastic material and including a tray portion 11 and a lid 12. The tray portion 11 is provided with a bottom 13 and integral upstanding front and rear walls 14 and 15, respectively, and side walls 16 and 17, forming a rectangular enclosure. The lid 12 is suitably pivoted to the tray portion 11, preferably by a hinge 18 formed along the rear wall 16 of the tray portion.

The tray portion 11 is divided into a plurality of compartments for housing the various components of the educational apparatus of the present invention. An elongated partition 19 extending the full width of the tray portion 11 between the front and rear walls 14 and 15 is disposed parallel to and spaced slightly from the side wall 17 to provide an elongated compartment 20 adapted to house a liquid dropper 21 similar in construction to the conventional medicine dropper. Partitions 22, 23, 24 and 25 each formed of right angularly related wall sections 26 are provided at the four corners of the tray portion 11 and define between the partitions 22, 23, 24 and 25 and the corners of the front, rear and side walls 14, 15, 16 and 17 square or rectangular compartments 27, 28, 29 and 30. A cross-shaped compartment 31 formed between the partitions 22, 23, 24 and 25 occupies the remainder of the tray area. Preferably, the partitions 19, 22, 23, 24 and 25 are formed of plastic material similar to the plastic material from which the box 10 is constructed and are united with the walls 14, 15, 16 and 17 of the tray portion 11 to form a rigid, durable assembly.

Disposed within the square or rectangular compartments 27, 28, 29 and 30 defined by the partitions 22—25 are sponge rubber blocks 32, 33, 34 and 35, respectively, which are saturated with water-soluble paint or coloring media. In the preferred embodiment, the sponge rubber blocks 32, 33, 34 and 35 are respectively saturated with black, red, blue and yellow paint or coloring media.

Disposed within the leg portions 36 of the cross-shaped compartment 31 are four finger cots or thimble-shaped cups 37, all of identical construction, to be applied to the finger of the child and provide an implement for transfer of the paint or coloring media from the paint-saturated sponge rubber blocks 27, 28, 29 and 30 to the paper or other material to which the paint is to be applied. These finger cots, as shown in detail in Figure 4, are preferably formed of a vinyl plastic body having a tubular sleeve portion 38 of a size and shape to extend over the end portion of the index finger of the child back to approximately the first joint and having an end closure portion 39 at one end. Embedded within and projecting from the end closure portion 39 is a small disk-shaped pad 40 of felt or other absorbent material which is applied to the vinyl plastic cot 37. Preferably, the felt pad 40 is applied to the end closure portion 39 of the cot 37 prior to baking of the vinyl thermoplastic material forming the cots so as to securely affix the pad 40 to the cot 37, although cementing or other known securing expedient may be employed. Also, the four cots 37 provided in the box 10 are preferably formed of plastic material of the same color as the paint with which the four sponge rubber blocks 32, 33, 34 and 35 are saturated, to assist the children in allocating the cots 37 to the appropriate colors of paint.

The finger cots or thimble-shaped cups 37 may be advantageously used in reading instruction in connection with the kinesthetic-tactile approach to word imagery. In the practice of this method, the instructor initially prepares large cards having written thereon preferably in manuscript, the words which are the subject of the exercise. After each child has placed one of the finger cots 37 over the end of his index finger, the children are caused to trace the printed or written word on the cards with the pad 40 of the cot 37 in direct contact with the writing on the cards. Since no intermediate tracing object is required to be grasped by the child in connection with this exercize, the finger cot obviates the muscular fatigue which would arise from gripping of a tracing object and avoid dulling of the motor response which would be a product of such fatigue. Further, since the pad 40 of the finger cot 37 is in direct contact with the pad of the index finger on which the cot is worn and with the markings of the card, response of the sense of touch to the exercize is more intimate and the fixing of the word image is enchanced.

As a further step in the kinesthetic-tactile method of word imagery, the child is caused to write or print upon blank cards the word which is the subject of the exercize. The finger cot 37 is equally suitable for this exercize, as the absorbent pad 40 on the end of the finger cot may absorb coloring media of any desired color by placing the felt pad 40 in contact with one of the water-soluble paint-saturated blocks 32, 33, 34 and 35, to which a selected quantity of water has been applied by the dropper 21, to place a selected quantity of the coloring medium in the solution. The pad 40 of the finger cot 37 then serves as a transfer agent by which the coloring media may be applied to the card as the strokes of the printed or written word are duplicated by the index finger of the child.

The finger cots 37 with the absorbent felt pads 40 thereon also serve as a convenient protective paint transfer implement for use in connection with finger painting exercizes. In the preferred embodiment, four finger cots 37 are provided, in colors corresponding to the color of the coloring medium with which the blocks 32—35 are saturated, so as to encourage the child to use the individual finger cots allocated to the separate colors provided. The use of the finger cot eliminates the presence of residual quantities of paint or coloring medium on the finger of the child, and therefore affords a substantial measure of protection against the soiling of the children's clothing by this source of coloring medium.

Of greater importance in connection with art exercises is the fact that the quantities of coloring medium of the various colors to be used during the exercize can be effectively controlled by the instructor with the present invention by the application of a selected number of drops of water on each block 32—35 from the liquid dropper 21. In this way, the instructor, by judicious selection of the quantity of water applied to the blocks 32—35, can determine with a high degree of accuracy the quantity of liquid paint or coloring media made available to the child during the exercize or stages of the exercize. Since the present invention obviates the necessity of making open jars of paint available to the children in such exercizes, and permits such control of the supply of paint as to materially reduce the availability of liquid paint for application to clothing, classroom fixtures and the like, the problems of effective supervision in connection with such exercizes are minimized. The present invention, therefore, is not only of material assistance in achieving maximum over-all perception and response to the kinesthetic-tactile word imagery exercizes, but is of great value in achieving effective control of quantities of liquid coloring media for use in any classroom exercizes requiring the same with minimum educational supervision.

While but one particular embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

I claim:

1. Apparatus for use in connection with reading and art instruction comprising a box including hingedly connected tray and lid portions, partition means dividing said tray portion into a plurality of rectangular compartments, a sponge block seated in certain of said plurality of said rectangular compartments, said sponge blocks being saturated with water-soluble dry paint of different colors, liquid dropper means seated in another of said compartments for applying measured quantities of water to said sponge blocks to dissolve preselected limited quantities of the paint absorbed therein, and a plurality of plastic finger cots seated in at least one other of said rectangular compartments for transferring the dissolved paint to a coloring surface and adapted to be fitted on the end of a child's finger, said finger cots having an absorbent pad supported in exposed position thereon to overlie the pad of the wearer's finger for absorbing dissolved paint upon contact with the sponge blocks and transferring the paint to a coloring surface.

2. Educational apparatus for use in connection with reading and art instruction comprising a box including hingedly connected tray and lid portions, partition means dividing said tray portion into a narrow compartment extending the width of the tray portion and a plurality of rectangular compartments spaced from each other to define a cross-shaped compartment therebetween, a sponge block seated in each of said rectangular compartments, said sponge blocks being saturated with water-soluble dry paint of different colors, liquid dropper means seated in said elongated compartment for applying measured quantities of water to said sponge blocks to dissolve preselected limited quantities of the paint absorbed therein, and a plurality of plastic finger cots seated in said cross-shaped compartment and corresponding in number to said sponge blocks, said finger cots being adapted to be fitted on the end of a child's finger and having an absorbent felt pad supported in an exposed position thereon to overlie the pad of the wearer's finger for absorbing dissolved paint upon contact with said sponge blocks and transferring the paint to a coloring surface.

References Cited in the file of this patent

UNITED STATES PATENTS

| | | |
|---|---|---|
| 1,205,779 | Peck | Nov. 21, 1916 |
| 1,297,784 | Birnbaum | Mar. 18, 1919 |
| 1,901,861 | Baker | Feb. 20, 1932 |
| 2,002,144 | Heaton | May 21, 1935 |
| 2,151,846 | Greneker | Mar. 28, 1939 |
| 2,206,722 | Fidelman | July 2, 1940 |
| 2,722,706 | Chopp | Nov. 8, 1955 |